United States Patent Office 3,004,063
Patented Oct. 10, 1961

3,004,063
METHOD FOR THE PRODUCTION OF 4,4'-DIHYDROXY-β-CAROTENE, 4,4'-DIHYDROXY-15,15'-DEHYDRO-β-CAROTENE AND ESTERS THEREOF
Roland Entschel and Paul Karrer, Zurich, Switzerland, assignors to Hoffmann-La Roche Inc., Nutley, N.J., a corporation of New Jersey
No Drawing. Filed Jan. 13, 1959, Ser. No. 786,466
Claims priority, application Switzerland Jan. 20, 1958
7 Claims. (Cl. 260—488)

This invention relates to a method for the production of 4,4'-dihydroxy-β-carotene, 4,4'-dihydroxy-15,15'-dehydro-β-carotene and esters thereof. The nomenclature employed herein uses the system shown for β-carotene by Goodwin, "Carotenoids, Their Comparative Biochemistry" (Chemical Publishing Co., New York, 1954) page 2.

The method of this invention comprises treating a compound of the group consisting of β-carotene and 15,15'-dehydro-β-carotene in the presence of an organic acid successively with N-bromosuccinimide and with a tertiary organic base. A diester of 4,4'-dihydroxy-β-carotene or 4,4'-dihydroxy-15,15'-dehydro-β-carotene, respectively, is obtained as a product of this reaction. The ester may be converted to 4,4'-dihydroxy-β-carotene and 4,4'-dihydroxy-15,15'-dehydro-β-carotene, respectively, by saponification.

The organic acids which are used for the reaction with β-carotene and which provide the acyloxy groups for the diester include alkanoic acids such as those in the fatty acid series, e.g. formic acid, acetic acid, propionic acid, butyric acid, etc., benzoic acid and aralkanoic acids, such as phenyl acetic acid and the like. The reaction is best carried out in a polar solvent such as chloroform, methylene chloride, dichloroethane, etc. The tertiary organic bases used in the reaction include such compounds as N-alkylmorpholine, e.g. N-ethylmorpholine, N-alkylpiperidine, e.g. N-ethylpiperidine, trialkylamines, e.g. trimethylamine, triethylamine, diethyl aniline, etc.

It is advantageous to permit the reaction to proceed at a low temperature, preferably below 0° C., and then after a short time, say after about one-half minute, to add the tertiary base in order to neutralize the resulting hydrogen bromide and eventually the excess organic acid.

The diester of 4,4'-dihydroxy-β-carotene, e.g. a 4,4'-dialkanoyloxy-β-carotene or a 4,4'-diaralkanoyloxy-β-carotene and the diester of 4,4'-dihydroxy-15,15'-dehydro-β-carotene, respectively, produced as a result of the reaction described above may be saponified to obtain 4,4'-dihydroxy-β-carotene or 4,4'-dihydroxy-15,15'-dehydro-β-carotene, respectively, by treatment with an alcoholic alkali solution, for example, alkanolic alkali metal hydroxide solution, e.g. methanolic potassium hydroxide, preferably by warming gently say at a temperature of about 50° C.

The products of this method may be purified by conventional procedures, for example, by partitioning between solvents, chromatography, etc.

The following examples are illustrative of this invention. All temperatures are expressed in degrees centigrade.

Example 1

500 mg. of β-carotene were dissolved in 50 cc. of chloroform. A mixture of 0.33 g. N-bromosuccinimide, 1.5 cc. of glacial acetic acid and 40 cc. of pure chloroform were added to the solution at −18° while stirring vigorously under a current of dry nitrogen. 30 seconds later 4 g. of N-ethylmorpholine were added. The temperature of the reaction mixture was permitted to rise to +10°. Then it was diluted with an equal volume of petroleum ether, agitated with 0.1 N hydrochloric acid until weakly acid, then immediately washed with sodium bicarbonate solution and with water. The mixture was permitted to stratify, the chloroform-petroleum ether layer was separated and dried with sulfate and, after filtration, the solvent was evaporated in vacuo. The residue, comprising 4,4'-diacetoxy-β-carotene, was taken up in 6 cc. of benzene. The solution was treated with 50 cc. of 15 percent potassium hydroxide in methanol solution and heated at 50° for 20 minutes. The homogeneous solution was diluted with 100 cc. of water and 100 cc. of benzene, the benzene layer washed free of alkali with water, dried over sodium sulfate and evaporated in vacuo after filtration. The residue was primarily a crystalline material, comprising 4,4'-dihydroxy-β-carotene, which was recrystallized from ethyl acetate-petroleum ether. An additional quantity of 4,4'-dihydroxy-β-carotene was obtained from the mother liquor of the crystallisate by chromatographic purification on calcium carbonate (benzene as solvent), M.P. 169°.

Example 2

The procedure described in Example 1 was repeated substituting 2.0 cc. of propionic acid for the glacial acetic acid and 4 g. of N-ethylpyridine for the N-ethylmorpholine to obtain 4,4'-dipropionoxy-β-carotene.

Example 3

1 g. of 15,15'-dehydro-β-carotene was dissolved in 100 cc. of pure chloroform and 1.5 cc. of glacial acetic acid. The solution was then cooled at −18°. While vigorously stirring the mixture for two minutes at −18°, 0.66 g. of N-bromosuccinimide were added in one portion. Immediately thereafter 8 cc. of diethyl aniline were added and the temperature of the reaction mixture was permitted to rise to 20° within the next 30 minutes. Then, it was diluted with 100 cc. of diethyl ether and washed with 0.1 N hydrochloric acid, with water, with 5 percent sodium bicarbonate solution, and again with water. After drying over sodium sulfate, filtering and driving off the solvent, the residue, 4,4'-diacetoxy-15,15'-dehydro-β-carotene, was agitated at room temperature in a nitrogen atmosphere with a solution of 1 g. of potassium hydroxide in 10 cc. of methanol and 50 cc. of dimethyl ether. The mixture was diluted with dimethyl ether and treated twice with 300 cc. of water. The ether extract was dried with sodium sulfate and then concentrated. The residue was 1.2 g. of crude 4,4'-dihydroxy-15,15'-dehydro-β-carotene, which crystallised as red crystals from methylene chloride-methanol; M.P. 149–150°.

We claim:

1. A process for the production of 4,4'-diesters of a member of the group consisting of β-carotene and 15,15'-dehydro-β-carotene, respectively, which comprises reacting a compound of the group consisting of β-carotene and 15,15'-dehydro-β-carotene in the presence of an organic acid selected from the group consisting of alkanoic acid, benzoic acid and aralkanoic acid in a polar organic solvent successively with N-bromosuccinimide and a tertiary organic base selected from the group consisting of N-alkylmorpholine, N-alkylpiperidine and trialkylamine.

2. A process as in claim 1 wherein the organic acid is acetic acid and the tertiary organic base is N-ethylmorpholine.

3. A process as in claim 1 wherein the organic acid is propionic acid and the tertiary organic base is N-ethylpiperidine.

4. A process as in claim 1 wherein the organic acid is acetic acid and the tertiary organic base is diethyl aniline.

5. A process for the production of a member of the group consisting of 4,4'-dihydroxy-β-carotene and 4,4'-dihydroxy-15,15'-dehydro-β-carotene, respectively, which comprises reacting a compound of the group consisting of β-carotene and 15,15'-dehydro-β-carotene in the presence of an organic acid selected from the group consisting of alkanoic acid, benzoic acid and aralkanoic acid in a polar organic solvent successively with N-bromosuccinimide and a tertiary organic base selected from the group consisting of N-alkylmorpholine, N-alkylpiperidine and trialkylamine, then saponifying the product of the reaction with alkali.

6. A process which comprises reacting a compound of the group consisting of β-carotene and 15,15'-dehydro-β-carotene in the presence of acetic acid at a temperature below about 0° C. successively with N-bromosuccinimide and N-ethylmorpholine to produce, respectively, a member of the group consisting of 4,4'-diacetoxy-β-carotene and 4,4'-diacetoxy-15,15'-dehydro-β-carotene.

7. A process which comprises reacting a compound of the group consisting of β-carotene and 15,15'-dehydro-β-carotene in the presence of acetic acid at a temperature below about 0° C. successively with N-bromosuccinimide and N-ethylmorpholine to produce, respectively, a member of the group consisting of 4,4'-diacetoxy-β-carotene and 4,4'-diacetoxy-15,15'-dehydro-β-carotene, and reacting the latter with an alkali metal hydroxide to obtain, respectively, a member of the group consisting of 4,4'-dihydroxy-β-carotene and 4,4'-dihydroxy-15,15'-dehydro-β-carotene.

References Cited in the file of this patent
UNITED STATES PATENTS 2,871,267    Petracek et al. _____ Jan. 27, 1959

OTHER REFERENCES

Zechmeister et al.: J. Am. Chem. Soc., 75, 4493–4495 (1953).

Wallclave et al.: J. Am. Chem. Soc., 75, 4495–4498 (1953).

Karmakar et al.: J. Am. Chem. Soc., 77, 55–60 (1955).

Petracek et al.: J. Am. Chem. Soc., 78, 1427–1434 (1956).